United States Patent [19]

Wisnieff

[11] 4,378,556
[45] Mar. 29, 1983

[54] GRAY SHADE OPERATION OF SEQUENTIALLY ADDRESSED AC PLASMA PANEL

[75] Inventor: Robert E. Wisnieff, Weston, Conn.

[73] Assignee: United Technologies Corporation, Hartford, Conn.

[21] Appl. No.: 101,660

[22] Filed: Dec. 10, 1979

[51] Int. Cl.³ .............................................. G09G 3/28
[52] U.S. Cl. .................................. 340/793; 340/767; 340/805; 358/240
[58] Field of Search ............... 340/793, 767, 240, 766, 340/771, 779, 789, 805

[56] References Cited

U.S. PATENT DOCUMENTS

| | | | |
|---|---|---|---|
| 3,765,011 | 10/1973 | Sawyer et al. | 340/793 |
| 3,821,721 | 6/1974 | Hughes | 340/793 |
| 3,937,878 | 2/1976 | Judice | 340/793 |
| 3,952,230 | 4/1976 | Sakai | 340/793 |
| 4,193,095 | 3/1980 | Mizushima | 340/793 |

Primary Examiner—Marshall M. Curtis
Attorney, Agent, or Firm—Richard P. Lange

[57] ABSTRACT

A circuit configuration for use with a small plasma panel to allow independent variation of the brightness level on a raster in addition to the information displayed by the raster. The gray scale level of all or part of the displayed information can be changed in response to a change in a sensed condition. The desired gray shade level or levels for a particular raster of digital information is stored in a simple memory. The data out of the memory is used by an E/W pulse gate to clock write pulses and erase pulses to the addressing circuitry of the plasma panel. The write or erase pulses then combine with the sustainer voltage waveform at each site to either strike, entinguish, or not change discharge state of each site as the plasma panel as the individual site locations are sequentially addressed.

6 Claims, 4 Drawing Figures

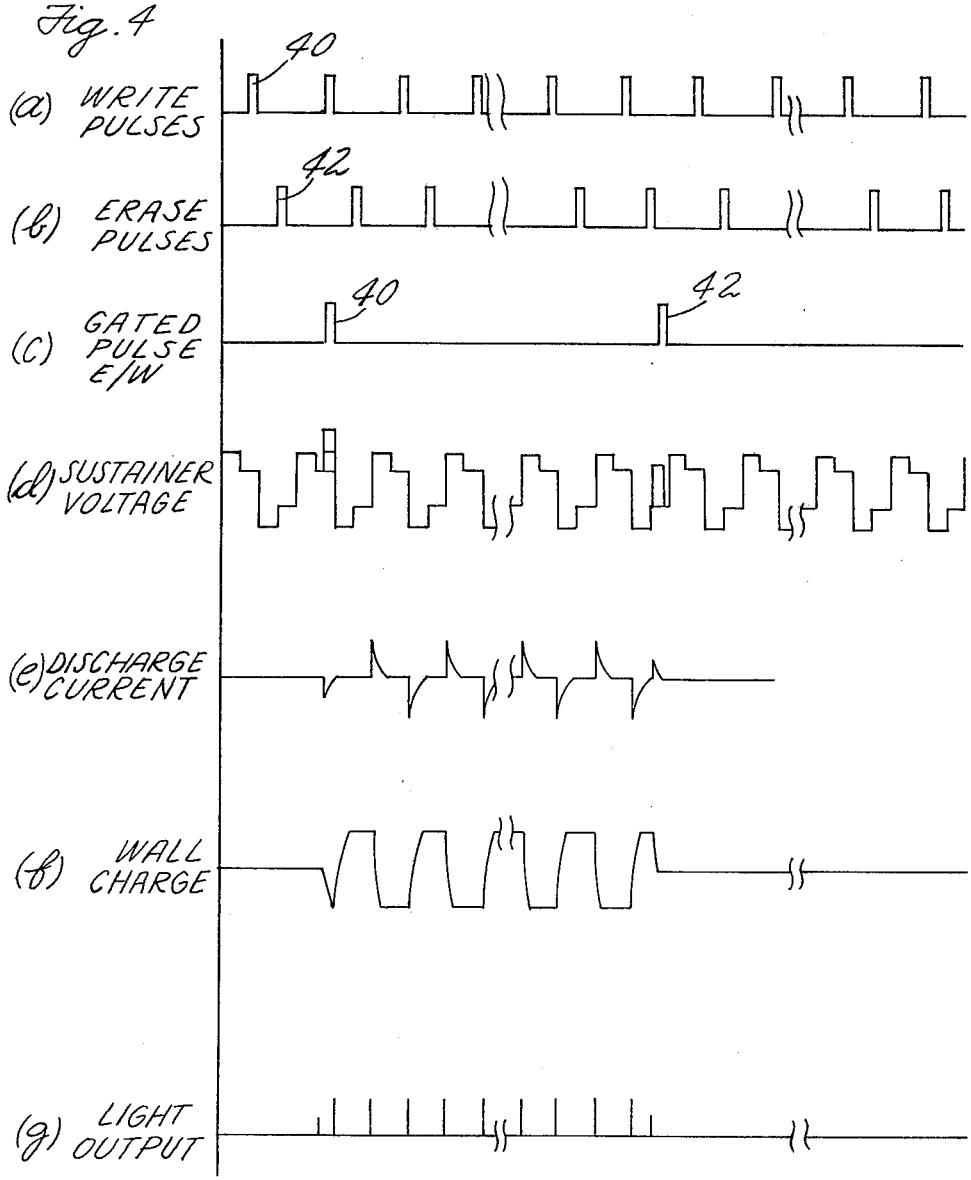

GRAY SHADE OPERATION OF SEQUENTIALLY ADDRESSED AC PLASMA PANEL

CROSS REFERENCE TO RELATED APPLICATIONS

This case discloses subject matter which is similar to that disclosed in U.S. patent application Ser. No. 101,659 filed on the same date by the same inventor for GRAY SHADE OPERATION OF A LARGE AC PLASMA PANEL.

DESCRIPTION

TECHNICAL FIELD

This invention relates to an AC plasma display device and, more particularly, to a circuit configuration for causing the basically bistable gaseous discharge plasma panel to demonstrate intensity variations or gray scale operation.

BACKGROUND ART

A multiple cell AC plasma panel is one type of gas discharge panel in which a gas medium, typically comprised of a mixture of two or more gases at a suitable gas pressure, is disposed in a transparent chamber or envelope. A multiplicity of electrodes are positioned on both sidewalls of the envelope and each electrode is normally coated with a dielectric material so that an ionized current flows therebetween during the operation of the panel creating a light pulse.

The dielectric layers disposed on the electrodes are significant because the current created by the ionized gas is prevented from actually reaching the electrodes during each half cycle of the operation. As is known, once the arc of ionized gas is struck at a particular discrete site, charges in opposition to the current flow collect on the dielectric surfaces creating an EMF opposing further current flow during that half cycle. During the next half cycle, the process is reversed and charges of opposite polarity build up on the dielectric surface areas that resists electron flow during the next half cycle.

In the construction of an AC plasma panel the multiplicity of electrodes are often positioned in an orthogonal configuration forming a matrix of rows and columns which can be readily addressed to display various types of data. Although the orthogonal configuration is probably the best known electrode arrangement, the electrodes could be arranged in any desired format which might be more convenient for displaying certain types of video data, such as circular electrodes in conjunction with radial electrodes for displaying radar video data and so forth.

A particular problem associated with the use of AC plasma panels, as well as many other solid state panels, is that plasma panels are basically bistable devices, i.e. there are only two modes—on or off. Because of this characteristic, obtaining gray scale variation of the individual discrete areas in the panel has been difficult and a number of different techniques have been used to create the appearance of intensity variations at each discrete panel site, or, as it has become known, gray scale panel operation. Some of the known techniques include:

(1) Multiple sites per resolution area—a plurality of discharge sites are used in each resolvable elemental area and intensity variation is created by increasing or decreasing the number of sites turned on. One such device is disclosed in U.S. Pat. No. 3,886,403 issued May 27, 1975 to Owaki et al for BRIGHTNESS MODULATION SYSTEM FOR A PLASMA DISPLAY DEVICE. In the system described by Owaki et al a single picture element is made up of a plurality of discharge cells and the perceived brightness is proportional to the total number of discharges of all the cells within a given period. The illusion of brightness is created by lighting that fraction of those cells in each group which correspond to the average instantaneous level at that point on the incoming video signal. In essence, the brightness of the individual area is proportional to the number of discrete elements turned on in that area. A problem with this particular technique is that each area requires a number of lightable sites, that number corresponds to the number of intensity levels, and hence the manufacturing cost is dramatically increased due to the total number of electrodes required for a given resolution. Another way of looking at this approach is that the technique achieves the impression of brightness variation at the expense of resolution.

(2) Amplitude variation of sustainer pulses—a trigger pulse initiates a sequence of discharges which decrease in amplitude until they eventually die out, the average brightness of the light emitted being controlled by varying the magnitude of the trigger pulse hence the decay time. Both U.S. Pat. No. 4,067,047 issued Jan. 3, 1978 to W. Ryan for CIRCUIT AND METHOD FOR GENERATING GRAY SCALE IN GASEOUS DISCHARGE PANELS and U.S. Pat. No. 4,002,828 issued Jan. 11, 1977 to J. Nolan for METHOD AND CIRCUIT FOR GENERATING GRAY SCALE IN GASEOUS DISCHARGE PANELS describe essentially identical techniques for obtaining gray scale variation at each discharge site in a plasma panel. A trigger pulse is applied across the electrodes at a particular site and initiates a discharge sequence which persists for a known period depending on the initial magnitude and duration of the trigger voltage.

(3) Time or duty cycle modulation—each discrete site can be turned on at a selected time within a given period and the intensity is varied by controlling the relative on time. One such system is disclosed in U.S. Pat. No. 3,863,023 issued Jan. 28, 1975 to L. Schmersal et al for METHOD AND APPARATUS FOR GENERATION OF GRAY SCALE IN GASEOUS DISCHARGE PANEL USING MULTIPLE MEMORY PLATES. A multiplicity of memory planes equal in number to the number of gray level ranges to be reproduced is provided. Each memory plane has the same number of storage areas as the number of storage and discharge areas that the display panel has. An image is scanned and the picture elements are separated into a finite number of shades of gray, equal in number to the number of memory planes provided. Each memory element is stored in its proper sequence in a memory plane associated with the shade of gray that the picture element corresponds to and the contents of the memory plane are then sequenced into the panel to reproduce the original picture. A problem with this technique is that the number of memory planes required is equal to the number of gray shade levels so that, for example, an eight gray shade system requires a memory with eight times the number of picture elements in the display. In addition, all of the elements of the panel are periodically extinguished so that the entire write cycle, which requires addressing each element of the panel individually, must be accomplished within one flicker period, or approximately sixteen milliseconds. For example, if a sustainer frequency of approximately 60 kilohertz is employed. (This approaches the upper possible frequency limit for a plasma panel because of the physical constraints of plasma initiation and decay) and this sustainer frequency is combined with an optimum addressing system so that a discrete element is addressed on each sustainer cycle; then, the maximum number of picture elements in the panel would be limited to approximately 1,000. In general, this size of a display is too small for a large raster, such as a TV raster or the like.

Also of general interest in this latter category is U.S. Pat. No. 3,975,661 issued Aug. 17, 1976 to Kanatani et al for DRIVING METHOD FOR A THIN-FILM ELECTROLUMINESCENT ELEMENT OF A THREE LAYER CONSTRUCTION: U.S. Pat. No. 4,021,607 issued May 3, 1977 to Amano for VIDEO DISPLAY SYSTEM EMPLOYING DRIVE PULSE OF VARIABLE AMPLITUDE AND WIDTH.

DISCLOSURE OF INVENTION

A particular object of the present invention is to provide a simple low cost circuit configuration for sequentially addressing each of the basically bistable discrete sites in a plasma panel to give the apparent effect of intensity variation.

An object of the present invention is to provide a circuit configuration for use in conjunction with the addressing circuitry of a plasma panel to sequentially address each site a sufficient number of times within a flicker period to cause gray scale operation.

According to a feature of the present invention, there is no erase interval for a circuit addressing all of the discrete sites in a plasma panel if the highest level of brightness is being displayed. This means that when a particular site is at its highest brightness level, it is continuously written so that flicker is reduced.

According to yet another feature of the present invention, an addressing circuit for a plasma panel scans the panel sites once during a flicker period. The highest brightness is continually excited and the frequency at which the eye perceives flicker decreases as the brightness decreases so that the panel sites need only be addressed once within a flicker period to display the gray shade pattern. Interlace may also be used to further reduce flicker perception.

According to still another feature of the present invention, a simple memory, such as a pair of recirculating shift registers, receive and store a complete raster of digital video information which is ultimately to be displayed on a plasma type display panel. The stored data is used to clock write pulses or erase pulses to the discrete sites in the plasma panel as the decoding circuitry synchronously addresses each individual site. The write pulses or erase pulses start or stop a sequence of site discharges within a flicker Period to create perceived brightness variations of the raster.

BRIEF DESCRIPTION OF DRAWING(S)

FIG. 4 is a plot versus time of various waveforms at certain points in the embodiment of the gray scale circuit according to the present invention.

BEST MODE FOR CARRYING OUT THE INVENTION

Figure 1:
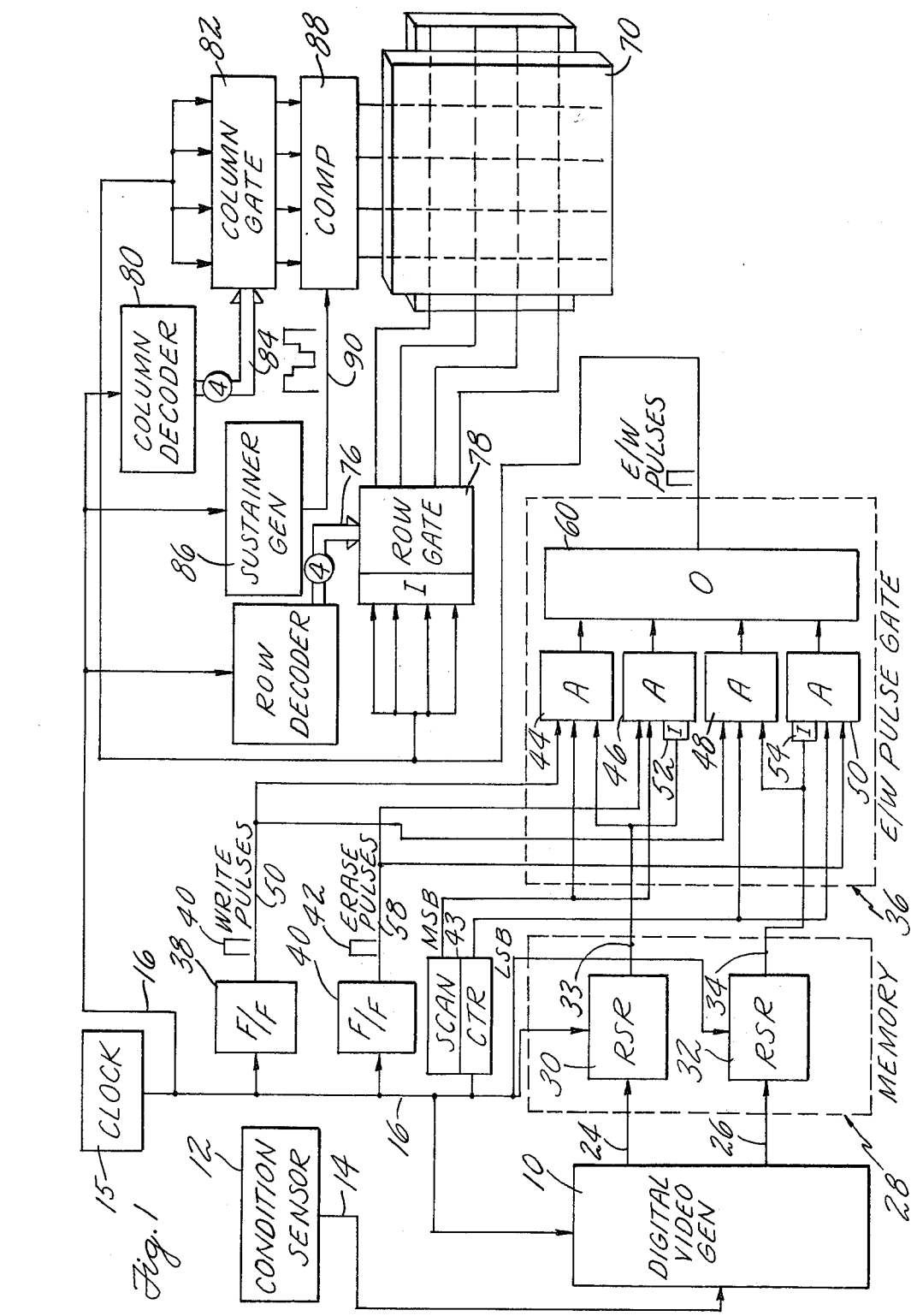
FIG. 1 is a block diagram of an embodiment according to the present invention for generating signal waveforms for presentation to a plasma panel for gray scale operation.

One embodiment of a circuit configuration for addressing an AC plasma panel to display a multiple gray scale or levels according to the present invention will now be described. Referring initially to FIG. 1, a digital video generator 10 is provided and could contain recorded video information stored in a raster format by a variety of known techniques, such as read only memories, etc., under control of a clock 15 connected thereto by line 16. A condition sensor 12 is connected to the digital video generator 10 by a line 14 and provides an input signal to the digital video generator indicating the existence of one, or more, sensed conditions. The digital video generator would, in turn, present at its output a preselected digital signal in accordance with the existance, by lack thereof, of any sensed condition by the condition sensor 12. This signal could include the bit-by-bit data to be displayed in a raster and also the gray scale of such information. In the embodiment of the present invention a four gray shade level display is shown and can be used to convey information to the viewer in conjunction with the recorded information on the raster.

The data from the digital video generator 10 is presented to a memory 28. Although numerous memory types and formats are known, one format would comprise recirculating shift registers (RSR), such as recirculating shift register 30 and 32, which are connected to receive input data on the lines 24 and 26, respectively. Here, it should be noted that only a two level memory, i.e. two shift registers, are required to display four levels of gray shade. This format might be best understood by reference to a video data code table shown hereinafter. The table shows a four level gray scale system, the corresponding code recorded in the shift registers for each level, and the corresponding number of discharges within a flicker period at a discrete site to obtain the gray scale level.

| VIDEO DATA CODE | | |
|---|---|---|
| Level | Two Bit Code | No. of Cycles |
| 0 | 00 | 0 |
| 1 | 01 | 16 |
| 2 | 10 | 32 |
| 3 | 11 | 48 |

Accordingly, the recirculating shift register 30 might receive the most significant bit (MSB) of data and the recirculating shift register 32 might receive the least significant bit (LSB) of data corresponding to the gray shade of the particular discrete site in the raster to be displayed.

A pair of bistable devices, such as flip-flop 38 and flip-flop 40, are connected to the line 16 and generate a continuous train of write pulses 40 and erase pulses 42. In addition, a scan synchronizer, such as scan counter 43, is included to determine which raster scans are scheduled to either write or erase corresponding to the weight of the stored data. For example, in the four gray shade system, sites with a high MSB must have twice as many discharges within the flicker period as sites for which the LSB is high. This synchronizer only changes state when the memory makes its transition from its final element to its first state. The E/W pulse gate 36 may include a logic circuit having AND gates 44, 46, 48, and 50. The AND gates 44 and 46 have one input which is coupled to the line 33 to receive the MSB from the recirculating shift register 30 and a second input is connected to the MSB line from the scan counter 43. The first input to the AND 46 is through an inverter 52 so that the ANDS 44 and 46 are not simultaneously enabled. In a similar manner, one input of the AND 48 and one input of the AND 50 is connected to the line 34 to receive the LSB from the recirculating shift register 32 and a second input is connected to the LSB line from the scan counter 43. The inverter 54 connected at the input of the AND 50 prevents the AND 46 and the AND 50 from being simultaneously enabled.

Each pair of AND gates are simultaneously fed with a continuous train of write pulses 40 and erase pulses 42. Accordingly, one input of the AND 44 and the AND 48 is connected to the line 56 from the output of the flip-flop 38 to receive the write pulses 40. Also, one input of the AND 46 and the AND 50 is coupled to line 58 from the output of the flip-flop 40 to receive a continuous train of erase pulses 42. The logic circuit in the E/W pulse gate 36 also includes an exclusive OR 60 positioned at the output of all of the AND gates to ensure that only one pulse is presented to each panel site. That is, if, for example, the AND 44 is enabled by a data bit clocked out of the recirculating shift register 30, then only that pulse will be passed out of the E/W pulse gate on the line 46 to the addressed site until the next raster scan.

Figure 2:
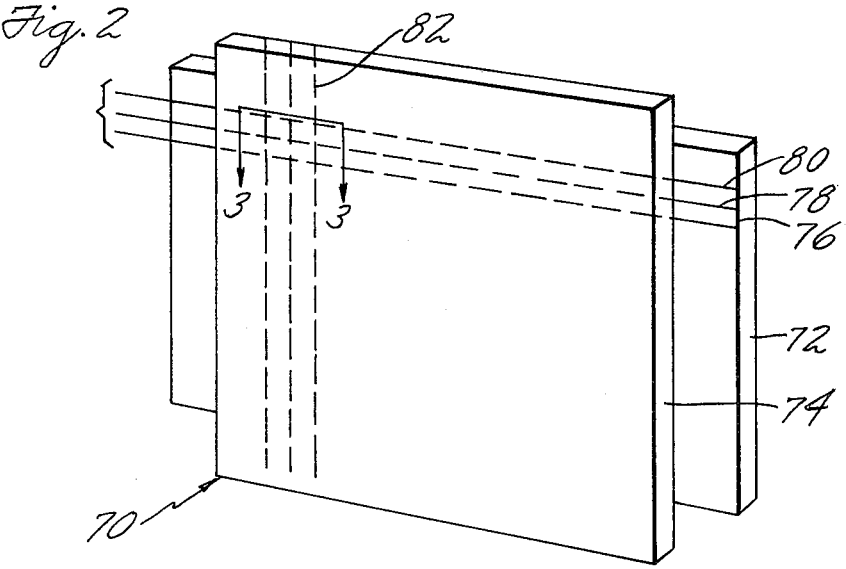
FIG. 2 is an isometric view of a typical plasma panel.
Figure 3:
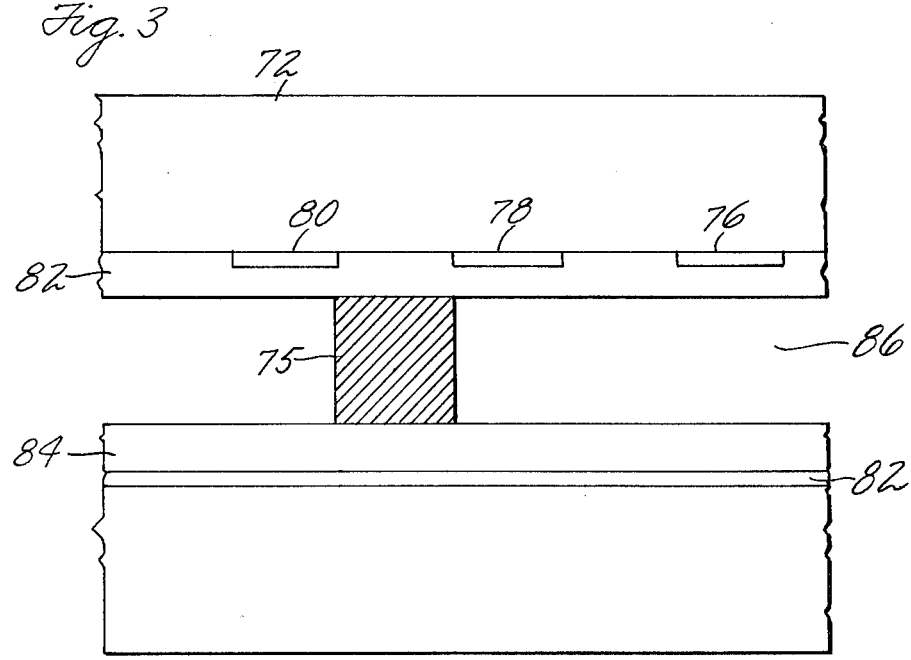
FIG. 3 is a partial cross-sectional view of FIG. 2 (enlarged, but not to scale) showing the internal arrangement of a plasma panel.

Referring now to FIGS. 2 and 3, a typical embodiment of an AC plasma panel for use in conjunction with the multiple condition AC plasma panel will now be described. Because of the physical constraints imposed by plasma initiation and decay there is a maximum sustainer frequency which is generally employed. In most situations this maximum frequency is in the 60 kilohertz range. Thus, because the discrete site in the panel must be addressed in accordance with the present embodiment four times during a flicker period, the maximum number of picture elements would be approximately 1,000. Of course, the actual matrix of row and column electrodes could be in any configuration so long as the number of row electrodes times the number of column electrodes does not exceed approximately 1,000. The plasma panel 70 normally includes a pair of support substrates 72 and 74, both of which can be fabricated from a glass such as commercial grade lime plate glass or other similar glass. As is known, the substrate members 72 and 74 provide the majority of the mechanical panel strength and both faces of the panel must be capable of handling the gas pressure differential across the face with minimal flexure. Because of this strength requirement, substrate members are the thickest components of the panel and together, essentially define the overall thickness of the panel. The substrate members 70 and 72 are most often separated by a spacer 75 (FIG. 4) and the exact separation between the two substrate members is critical and relatively small, on the order of 5 mills. Furthermore, in addition to providing the strength to form a rugged panel the substrates, particularly in large panels, also serve as heat sinks for dissipating the heat generated by the electrical discharge between the two electrodes. Thus, the heat transfer capability of the substrates is important to enhance the ability of the panel to operate in an environment subject to widely fluctuating temperatures.

As is best seen in FIG. 2, a number of column electrodes, such as electrodes 76, 78, and 80 are normally provided and are positioned on substrate 72. A number of row electrodes, one such being electrode 82, are normally provided and positioned on substrate 74. The spacing between the row electrodes and the column electrodes is normally related to the desired resolution in the display raster. All of the electrodes are preferably fabricated from conductive material, such as gold or aluminum, and may be deposited on the substrates by numerous well-known processes such as vacuum deposition, stencil screening, photo etching, or the like. Tin oxide or indium oxide can also be used for the fabrication of electrodes on the smaller plasma panels because their higher resistance is still within acceptable limits and their transparent or semi-transparent characteristics is desirable. If the electrodes are fabricated from the more opaque materials, i.e. metals, the width of each individual electrode would normally be as thin as reasonably possible so that the light discharged at each discrete site will not be blocked on its route through the substrate to the viewer. As is best seen in FIG. 3, a dielectric layer 82 and 84 are positioned on the substrate 72 and 74, respectively, thus coating the surface of each electrode. The material forming the dielectric layer is preferably selected so that its thermal expansion characteristics somewhat match the thermal expansion characteristics of the material forming the substrates. Each dielectric layer should be smooth, without cracks, holes, dirt, or other surface imperfections so that it will have a high and relatively constant breakdown voltage, i.e. on the order of 1,000 volts. In that electron flow occurs through the space in the envelope defined by the two substrates, the dielectric material should also have good electron emissive capability, or alternatively, both of the dielectric layers 82 and 84 may be covered with an overcoat designed to produce such electron emission. As would be expected, the dielectric material and overcoat, if any, should be relatively transparent in that the light generated between the substrates needs to pass out to the viewer. Two substrates 72 and 74 are held apart from each other in part by a spacer 75 and define a closed envelope or chamber 86 which can be hermetically sealed. The spacer 75 is sized and positioned between the two substrates to maintain a constant spacial separation between the sidewalls throughout the panel area. In the manufacturing process, the chamber 86 is sealed around the outside edge and then evacuated so that the chamber can be filled with an ionizationable gas. A number of gases, or gas mixtures, are known to be suitable as a gaseous discharge medium for a plasma panel. These gases or gas mixtures include neon with a minority of xenon or argon, helium, or other noble gases.

The individual discrete sites of an AC plasma panel are operated by impressing an electrical potential of a certain magnitude across one row electrode and one column electrode to form a sufficient gradient to cause ionization of the gas. This ionization allows an electric discharge at that particular site producing a short pulse of light. The one of the two electrodes which is relatively positive collects electrons on the dielectric coating adjacent to the discharge site while the relatively negative electrode collects positive ions at the opposite end of the discharge site. Finally, as the magnitude of the differential between the positive and negative charges increases, the back voltage opposes further current flow causing a termination of the discharge until the relative potential of the two electrodes is reversed at the next half-cycle of the sustainer voltage waveform. The discharge through the gas medium which produces the light pulse only lasts for a very short period of time, normally less than a microsecond.

A particular feature of the present invention is that in operation a complete raster of display information is stored in a simple memory. The stored data bits in the memory are then used to clock erase pulses and write pulses to the individually addressed locations on the plasma panel. In the four level embodiment of the present invention all of the sites need only be addressed once within a flicker period, about 16 milliseconds, to avoid the appearance of flicker.

Referring again to FIG. 1, the addressing circuitry of the plasma panel 70 includes a row decoder 74 which is connected by a line 76 to row gate 78, there being one gate for each row electrode on the plasma panel 70. For the purposes of simplifying the drawing, the embodiment shown in FIG. 1 is illustrated with only four row electrodes and four column electrodes, but it should be understood that in the normal situation there would be many more row and column electrodes. A column decoder 80 is also provided and is connected to the line 16 so that it is synchronously controlled by the clock 15. The column decoder is connected to a plurality of column gates 82 by a line 84 so that each column of the plasma panel 70 can be addressed in sequence. A sustainer generator 86 is connected to the line 16 so that it is synchronously driven by the clock 15 and provides a sustainer voltage waveform to a combiner 88 via a line 90. The sustainer generator 86 continuously presents a sustainer voltage waveform to each of the column electrodes.

The operation of the present invention might be best understood by reference to FIG. 4 in conjunction with FIG. 1. The write pulses 40 (illustration (a) of FIG. 4) and the erase pulses 42 (illustration (b) of FIG. 4) are so synchronized by the clock 15 that the pulses when gated to the matrix of electrodes, the respective pulses appear across each discrete site in combination with the sustainer voltage waveform. The magnitude of the sustainer voltage waveform alone, when presented by a row and column electrode to an individual site, is insufficient to cause that site to turn on, but is sufficient to maintain the discharge sequence once the sequence has been initiated by a write pulse 40.

Any discrete site may be turned off or "erased" by an erase pulse clocked out of the E/W pulse gate 36 to the addressing circuitry of the plasma panel. The erase pulse 42 (illustration (b) of FIG. 4) is displaced from the write pulses 40 by one half cycle and thus is positioned on a different portion of the sustainer voltage waveform. The erase pulse 42 clocked to the addressing circuitry has the effect of causing a short discharge which is out of sequence at the particular address site. This removes the stored charge so that at the next reversal of the sustainer voltage waveform, the voltage gradient is insufficient to initiate a discharge thus extinguishing the light emitted by the particular site of interest.

I claim:

1. A gray scale circuit for causing apparent intensity variations on a plasma panel which has a number of row electrodes and a number of column electrodes, the intersection of which defines a discharge site, comprising:
   video means for generating a digital video signal that has been quantized into a predetermined number of levels in a raster format for presentation on said plasma panel;
   pulse means for generating a plurality of erase pulses, and a plurality of write pulses;
   decoder means for addressing said plurality of column electrodes and said plurality of row electrodes in a synchronous manner;
   storage means connected to said video means including one recirculating means for every two of said two levels of said predetermined number of levels, each of which is sized for storing at least one raster of video information;
   gate means including a pair of AND gates connected to each recirculating shift register in said storage means for gating selected ones of said erase pulses and write pulses to each of said discharge sites in said plasma panel at the same time each discharge site is being addressed by said decoder means; and
   whereby each of said discharge sites is written and erased for a predetermined interval during a flicker period so as to display gray scale variation.

2. A gray scale circuit according to claim 1, wherein said video means is a digital video generator which has a condition sensor connected thereto for identifying the existance, or lack of, a predetermined condition, and wherein said digital video generator has video information stored therein which is presented at its output in response to a condition sensed by said condition sensor.

3. A gray scale circuit according to claim 2, wherein said recirculating means are shift registers which receive data bits from said digital video generator thus updating the information stored therein.

4. A gray scale circuit according to claim 3, wherein said gate means comprises a first AND gate and a second AND gate, and wherein said first AND gate receives a plurality of write pulses at one input, and wherein said second AND gate receives a plurality of erase pulses at one input, and wherein said AND gates are enabled by data bits supplied from said pair of AND gates in said recirculating shift registers in said memory to clock either write pulses or erase pulses to said plasma panel.

5. A gray scale circuit according to claim 4, wherein said decoder means include a column decoder and a row decoder, both of which are connected to a clock so that they can sequentially address each discrete site of said plasma panel.

6. A gray scale circuit according to claim 5, further including a sustainer circuit coupled to a clock for presenting a sustainer voltage waveform to said column electrodes in synchronism with the write pulses and said erase pulses.

* * * * *